United States Patent
Dhanak et al.

(10) Patent No.: US 12,120,020 B2
(45) Date of Patent: Oct. 15, 2024

(54) DELAYING RESOURCE RESERVATION PROTOCOL LABEL-SWITCHED PATH SIGNALING THROUGH A RESTARTING NETWORK DEVICE

(71) Applicant: Juniper Networks, Inc., Sunnyvale, CA (US)

(72) Inventors: Karan Janakkumar Dhanak, Hamilton (CA); Nischal Singh, Nepean (CA); Rahul Unnikrishnan, Herndon, VA (US)

(73) Assignee: Juniper Networks, Inc., Sunnyvale, CA (US)

( * ) Notice: Subject to any disclaimer, the term of this patent is extended or adjusted under 35 U.S.C. 154(b) by 338 days.

(21) Appl. No.: 17/662,882

(22) Filed: May 11, 2022

(65) Prior Publication Data

US 2023/0370368 A1 Nov. 16, 2023

(51) Int. Cl.
*H04L 45/50* (2022.01)
*H04L 45/00* (2022.01)
*H04L 45/28* (2022.01)

(52) U.S. Cl.
CPC .............. *H04L 45/50* (2013.01); *H04L 45/26* (2013.01); *H04L 45/28* (2013.01)

(58) Field of Classification Search
CPC .......... H04L 45/50; H04L 45/26; H04L 45/28
See application file for complete search history.

(56) References Cited

U.S. PATENT DOCUMENTS

| 7,359,377 | B1 | | 4/2008 | Kompella et al. |
| 8,913,490 | B1 | * | 12/2014 | Barman ................. H04L 45/50 |
| | | | | 370/312 |
| 9,253,097 | B1 | * | 2/2016 | Barman ................. H04L 45/22 |
| 2010/0098096 | A1 | | 4/2010 | Yang |
| 2020/0366601 | A1 | * | 11/2020 | Singh ..................... H04L 69/40 |

(Continued)

FOREIGN PATENT DOCUMENTS

EP  3739828 A1  11/2020

OTHER PUBLICATIONS

Braden et al., "Resource ReSerVation Protocol (RSVP)—Version 1 Functional Specification," Network Working Group, Standards Track, Sep. 1997, 112 Pages.

(Continued)

*Primary Examiner* — Mandish K Randhawa
(74) *Attorney, Agent, or Firm* — Harrity & Harrity, LLP

(57) ABSTRACT

A network device may receive RSVP path request messages from an upstream ingress network device, and may generate an RSVP path error message, with an overload error code and a timeout period, after the network device is online within the configured timeout period. The network device may provide the RSVP path error message to the ingress network devices to cause the ingress network devices to wait for expiration of the timeout period, after the network device is fully online, until resending the RSVP path request messages. The network device may receive new RSVP path request messages from the ingress network devices after expiration of the timeout period after the network device is fully online, and may establish, based on the new RSVP path request messages, label-switched paths from the ingress network devices.

20 Claims, 10 Drawing Sheets

500 →

510 — Receive, by a network device that is restarting, resource reservation protocol (RSVP) path request messages from a plurality of core network devices located at a first site separate from a second site associated with the network device 520 — Generate an RSVP path error message, with an overload error code and a timeout period, after the network device is online within the timeout period 530 — Provide the RSVP path error message to the plurality of core network devices to cause the plurality of core network devices to wait for expiration of the timeout period, after the network device is online, until resending the RSVP path request messages

(56) References Cited

U.S. PATENT DOCUMENTS

2021/0359956 A1* 11/2021 Abdulla .............. H04L 47/6295

OTHER PUBLICATIONS

Extended European Search Report for Application No. EP22181690.3, mailed on Jan. 9, 2023, 12 pages.
Komolafe O., et al., "Evaluating and Improving the Performance of RSVP-TE graceful Restart," Broadband Communications, Networks and Systems, Sep. 2008, pp. 665-672, XP031414813, ISBN: 978-1-4244-2391-0.

* cited by examiner

DELAYING RESOURCE RESERVATION PROTOCOL LABEL-SWITCHED PATH SIGNALING THROUGH A RESTARTING NETWORK DEVICE

BACKGROUND

The resource reservation protocol (RSVP) is a transport layer protocol designed to reserve resources across a network using an integrated services model. The RSVP operates over Internet protocol version 4 (IPv4) or IP version 6 (IPv6) and provides receiver-initiated setup of resource reservations for multicast or unicast data flows. A label-switched path (LSP) is a path through a multiprotocol label switching (MPLS) network set up by a signaling protocol, such as the RSVP.

SUMMARY

Some implementations described herein relate to a method. The method may include receiving, by a network device that is restarting, RSVP path request messages from a plurality of core network devices located at a first site separate from a second site associated with the network device, and generating an RSVP path error message, with an overload error code and a timeout period, the network device is online within the timeout period. The method may include providing the RSVP path error message to the plurality of core network devices to cause the plurality of core network devices to wait for expiration of the timeout period, after the network device is fully online, until resending the RSVP path request messages.

Some implementations described herein relate to a network device that may include one or more processors. The one or more processors may be configured to receive RSVP path request messages from a plurality of core network devices located at a first site separate from a second site associated with the network device, and generate an RSVP path error message, with an overload error code and a timeout period, after the network device is online within the timeout period. The one or more processors may be configured to provide the RSVP path error message to the plurality of core network devices to cause the plurality of core network devices to wait for expiration of the timeout period, after the network device is fully online, until resending the RSVP path request messages, and receive new RSVP path request messages from the plurality of core network devices after expiration of the timeout period after the network device is fully online. The one or more processors may be configured to establish, based on the new RSVP path request messages, LSPs with the plurality of core network devices, via a plurality of fabric network devices located at the second site.

Some implementations described herein relate to a non-transitory computer-readable medium that stores a set of instructions for a network device. The set of instructions, when executed by one or more processors of the network device, may cause the network device to receive RSVP path request messages from a plurality of core network devices located at a first site separate from a second site associated with the network device, and generate an RSVP path error message, with an overload error code and a timeout period, after the network device is online within the timeout period. The set of instructions, when executed by one or more processors of the network device, may cause the network device to provide the RSVP path error message to the plurality of core network devices to cause the plurality of core network devices to wait for expiration of the timeout period, after the network device is fully online, until resending the RSVP path request messages, and receive new RSVP path request messages from the plurality of core network devices after expiration of the timeout period after the network device is fully online. The set of instructions, when executed by one or more processors of the network device, may cause the network device to establish, based on the new RSVP path request messages, LSPs with the plurality of core network devices, via a plurality of fabric network devices located at the second site, and receive traffic from the plurality of core network devices, via the LSPs and the plurality of fabric network devices located at the second site.

DETAILED DESCRIPTION

Figure 1A:
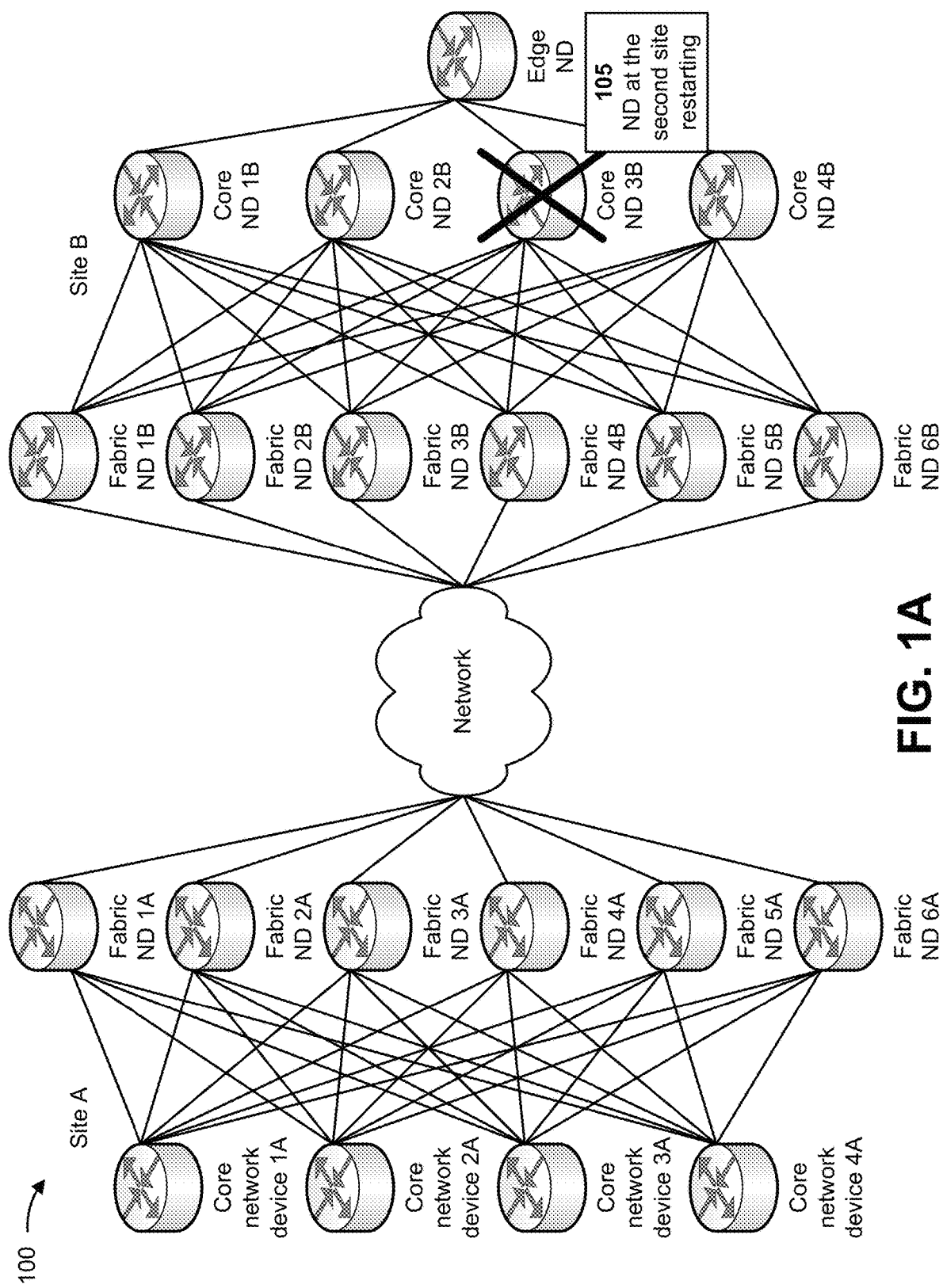
FIGS. 1A-1F are diagrams of an example associated with delaying RSVP LSP signaling through a restarting network device.

The following detailed description of example implementations refers to the accompanying drawings. The same reference numbers in different drawings may identify the same or similar elements.

A network may include multiple layers of network devices in which each network device is connected to a next layer of network devices in a full mesh. For example, a network may include two sites (e.g., site A and site B), and each site may include a core layer with four, six, eight, and/or the like network devices that connect with a fabric layer of network devices. Each network device in one layer may be connected to each network device in another layer. Each network device may be configured with an intermediate system to intermediate system (ISIS) overload timeout and to advertise high metrics during an overload condition. Each core network device from a core layer of site A may include an ingress automatic bandwidth RSVP LSP with a minimum bandwidth (e.g., one-hundred kilobytes) terminating at each core network device of site B.

Border gateway protocol (BGP) routes may be resolved on RSVP LSPs via a next hop for an edge layer of edge network devices. If a network device of the core layer is offline (e.g., for maintenance, to reboot, and/or the like), a metric for links of the network device may be set to a very high value after the network device comes online within a configured timeout period. When the metric is set to the very high value, the network device may be associated with active neighboring network devices and active egress LSPs. However, the LSPs may not transport traffic since the LSPs are associated with the very high metric and equal-cost multi-path routing (ECMP) paths for BGP routes are not created.

Many of the network devices in the network include multiple line cards that each communicate with other network devices. If the network device is taken offline and then restarted (e.g., rebooted), it is possible that one line card is enabled faster than other line cards are enabled and interfaces of the enabled line card communicate with neighboring network devices faster than interfaces of the other line cards communicate with neighboring network devices. For example, the one line card may be enabled one minute before the other line cards are enabled, and the enabled line card may communicate with a single neighboring network device prior to the other line cards. During the minute, the rebooted network device may be reachable via the single neighboring network device, such that LSPs directed towards the rebooted network device are signaled over only one link between the single neighboring network device and the rebooted network device. The single link may attempt to handle more traffic than expected, resulting in a traffic outage until the automatic bandwidth LSPs re-signal via new paths.

Thus, current techniques for handling a restarting network device consume computing resources (e.g., processing resources, memory resources, communication resources, and/or the like), networking resources, and/or the like, associated with reducing network bandwidth based on utilizing a single link for traffic, causing a traffic outage based on utilizing the single link for traffic, discovering the traffic outage, correcting the traffic outage, handling customer complaints associated with the traffic outage, and/or the like.

Some implementations described herein relate to a network device that delays RSVP LSP signaling through the network device after restarting the network device. For example, a network device may receive RSVP path request messages from a plurality of core network devices located at a first site separate from a second site associated with the network device, and may generate an RSVP path error message, with an overload error code and a timeout period, after the network device is online within the timeout period. The network device may provide the RSVP path error message to the plurality of core network devices to cause the plurality of core network devices to wait for expiration of the timeout period, after the network device is fully online, until resending the RSVP path request messages, and may receive new RSVP path request messages from the plurality of core network devices after expiration of the timeout period after the network device is fully online. The network device may establish, based on the new RSVP path request messages, LSPs with the plurality of core network devices, via a plurality of fabric network devices located at the second site, and may receive traffic from the plurality of core network devices, via the LSPs and the plurality of fabric network devices located at the second site.

In this way, the network device delays RSVP LSP signaling through the network device after restarting the network device. For example, after restarting, the network device may provide an RSVP path error message based on RSVP path requests received from other network devices associated with the network device. The RSVP path error message may indicate that the RSVP path requests cannot be served immediately and that the other network devices need to wait for a configured timeout period (e.g., in seconds, minutes, and/or the like) before re-signaling the RSVP path requests to the restarting network device. Thus, the network device conserves computing resources, networking resources, and/or the like that would otherwise have been consumed by reducing network bandwidth based on utilizing a single link for traffic, causing a traffic outage based on utilizing the single link for traffic, discovering the traffic outage, correcting the traffic outage, handling customer complaints associated with the traffic outage, and/or the like.

FIGS. 1A-1F are diagrams of an example 100 associated with delaying RSVP LSP signaling through a restarting network device. As shown in FIGS. 1A-1F, example 100 includes a first site (e.g., site A) with a core layer of core network devices (NDs) 1A-4A and a fabric layer of fabric network devices 1A-6A; a second site (e.g., site B) with a core layer of core network devices 1B-4B and a fabric layer of fabric network devices 1B-6B; and a network joining the first site and the second site. Further details of the network devices and the network are provided elsewhere herein. Although implementations described herein relate to restarting or rebooting a network device, the implementations may also be utilized with any powering up situation associated with the network device (e.g., when the network device is new and is powered up for a first time). The topology depicted in FIGS. 1A-1F is provided as an example and implementations described herein may be utilized with other topologies.

As shown in FIG. 1A, and by reference number 105, a network device (e.g., core network device 3B) located at the second site may be restarting. For example, if a network device (e.g., core network device 3B) of the core layer of site B is restarting (e.g., for maintenance, to reboot, and/or the like), a metric for links of the network device may be set to a very high value once the network device comes online within a configured overload timeout period. When the metric is set to the very high value, the network device may be associated with active neighboring network devices and active egress LSPs. However, the LSPs may not transport traffic since the LSPs are associated with the very high metric and ECMP) paths for BGP routes are not created.

The network device may include multiple line cards that each communicate with other network devices (e.g., the network devices provided in the fabric layer of site B). If the network device is taken offline and then restarted (e.g., rebooted), it is possible that one line card is enabled faster than other line cards are enabled and interfaces of the enabled line card communicate with neighboring network devices faster than interfaces of the other line cards communicate with neighboring network devices. For example, the one line card of core network device 3B may be enabled one minute before the other line cards are enabled, and the enabled line card may communicate with a single neighboring network device (e.g., fabric network device 4B) prior to the other line cards. During the minute, core network device 3B may be reachable via only fabric network device 4B, such that LSPs directed towards core network device 3B are signaled over only one link between fabric network device 4B and core network device 3B. The single link may attempt to handle more traffic than expected, resulting in a traffic outage until the automatic bandwidth LSPs re-signal via new paths.

Figure 1B:
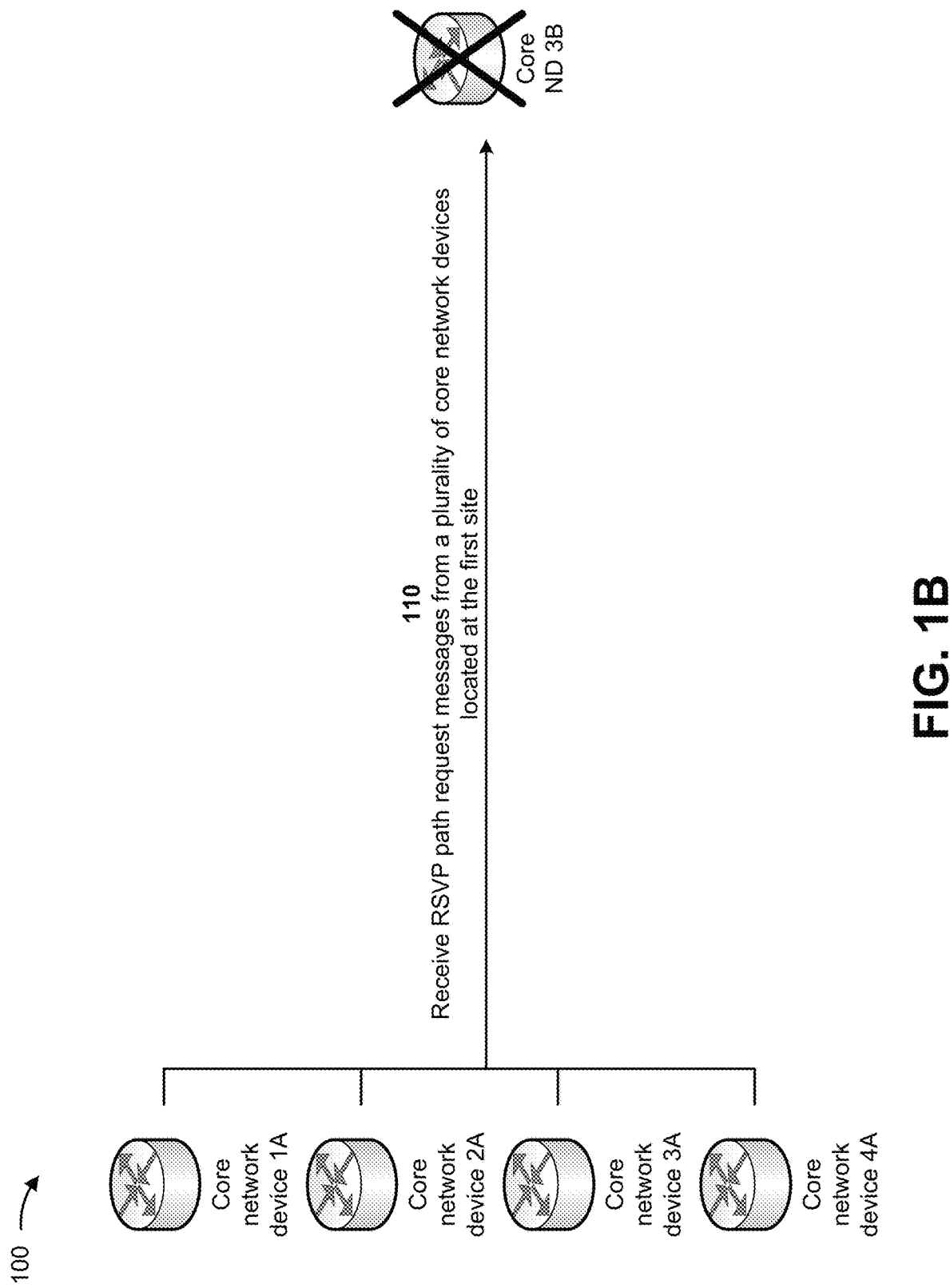

As shown in FIG. 1B, and by reference number 110, the network device may receive RSVP path request messages from a plurality of core network devices located at the first site. For example, when the interface between core network device 3B and fabric network device 4B is enabled before other interfaces of core network device 3B, the core network devices of site A (e.g., core network devices 1A-4A) may initiate RSVP path request messages towards core network device 3B to generate automatic bandwidth LSPs and reserve minimum bandwidth. Since the automatic bandwidth LSPs include minimum bandwidth values, all the automatic bandwidth LSPs may be enabled via the link between core network device 3B and fabric network device 4B. When core network device 3B is brought fully back fully online, the automatic bandwidth LSPs may carry traffic via the link between core network device 3B and fabric network device 4B and the link may eventually become congested. This may cause traffic drops that continue until an automatic bandwidth LSP adjustment interval creates new paths utilizing other links associated with core network device 3B.

Figure 1C:
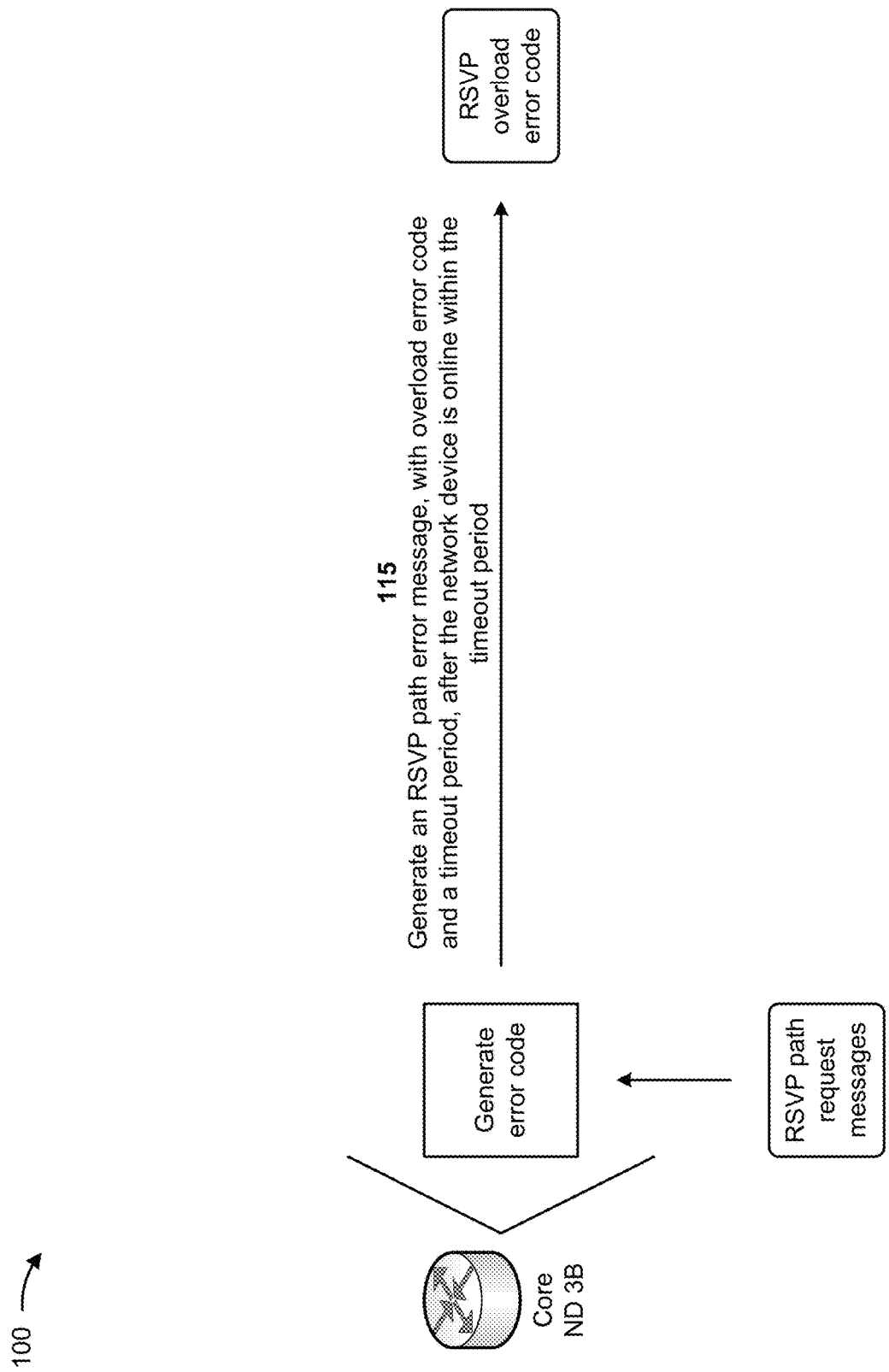

As shown in FIG. 1C, and by reference number 115, the network device may generate an RSVP path error message, with an overload error code and a timeout period, after the network device is online within the timeout period. For example, in order to prevent ingress network devices (e.g., the core network devices of site A) from creating LSPs through the network device (e.g., the restarting core network device 3B), the network device may generate a signaling mechanism that instructs the core network devices of site A to not create LSPs through the network device for the timeout period. The signaling mechanism may include the RSVP path error message that informs the core network devices of site A that the RSVP path request messages cannot be served immediately. The RSVP path error message may also instruct the core network devices of site A to wait for a configured quantity of seconds or minutes (e.g., the timeout period), after the network device is brought back fully online, before resending the RSVP path request messages to the network device. In some implementations, the timeout period may be set by a network administrator, may be set by the network device based on historical information relating to how long the network device and/or other network device take to restart, and/or the like. In some implementations, a timer for the timeout period may start on the network device after protocol software starts on the restarted network device. The network device may send the RSVP path error message as long as the timer is active and the timeout period in the RSVP path error message is equal to a remaining time on the timer at the time of sending the RSVP path error message.

In some implementations, the RSVP path error message may include an IPv4 format, an IPv6 format, and/or the like. In some implementations, the RSVP path error message may include an error code field (e.g., a one byte field indicating an RSVP overload error code type), and error value field (e.g., a two bytes field indicating the timeout period). If the timeout period is in seconds, the error value field may include a maximum timeout value of 65,535 seconds.

Figure 1D:
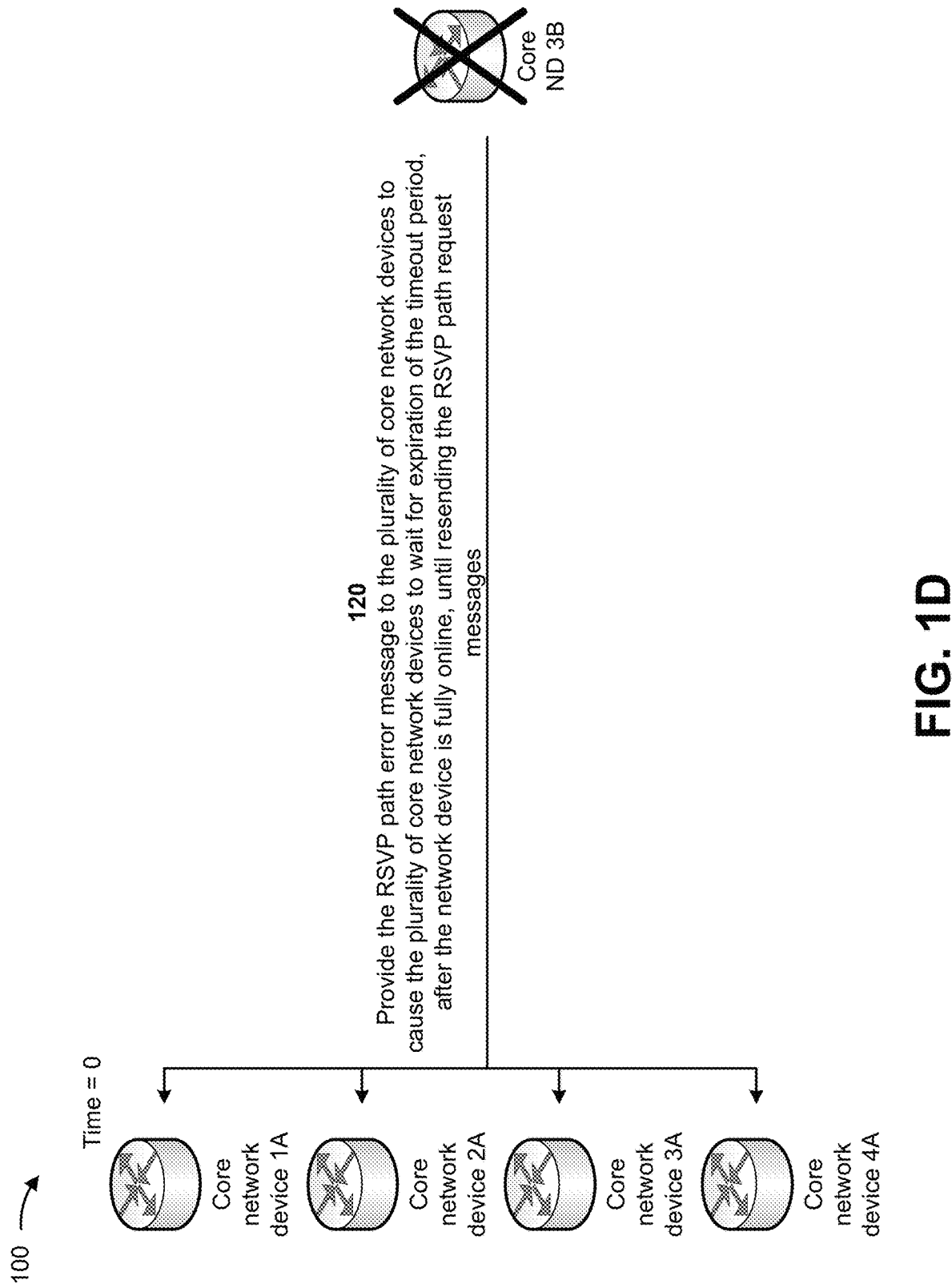

As shown in FIG. 1D, and by reference number 120, the network device may provide the RSVP path error message to the plurality of core network devices to cause the plurality of core network devices to wait for expiration of the timeout period until resending the RSVP path request messages. For example, the network device may provide the RSVP path error message to the plurality of core network devices (e.g., the core network devices of site A) that provided the RSVP path request messages to the network device. Each of the plurality of core network devices may receive the RSVP path error message, and may not attempt to signal an LSP again on a path containing the network device that originated the RSVP path error message for the timeout period specified in the RSVP path error message. This may ensure that whenever ingress network devices (e.g., the plurality of core network devices) are able to calculate and signal paths through the network device that rebooted or restarted, all possible paths are available for a fair distribution of LSPs. Thus, the RSVP path error message may prevent overloading of one or more links of the network device by the plurality of core network devices.

Figure 1E:
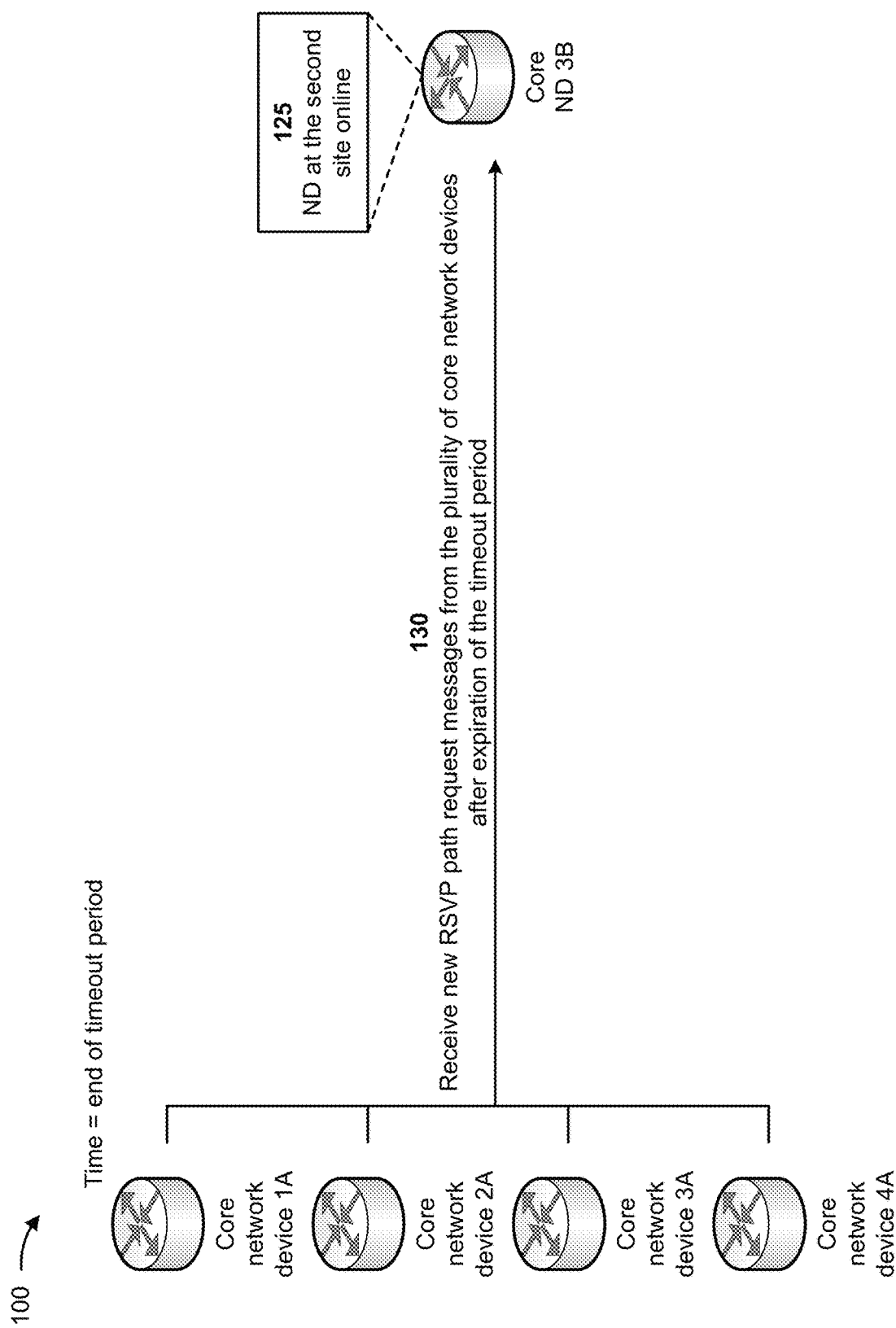

As shown in FIG. 1E, and by reference number 125, the network device located at the second site may be fully online. For example, the network device may be brought back fully online after the network device was restarted or rebooted. When the network device is brought back fully online, the line cards of the network device may be enabled and interfaces of the enabled line cards may communicate with neighboring network devices. For example, the line cards of core network device 3B may be enabled, and the enabled line cards may communicate with the neighboring network devices (e.g., fabric network devices 1B-6B).

As further shown in FIG. 1E, and by reference number 130, the network device may receive new RSVP path request messages from the plurality of core network devices after expiration of the timeout period. For example, once the timeout period expires, after the network device is brought back fully online, the network device may receive new RSVP path request messages from the plurality of core network devices. In some implementations, once the timeout period expires, after the network device is brought back fully online, the core network devices of site A (e.g., core network devices 1A-4A) may initiate the new RSVP path request messages towards core network device 3B to generate automatic bandwidth LSPs and reserve minimum bandwidth. Since the automatic bandwidth LSPs include minimum bandwidth values, all the automatic bandwidth LSPs may be enabled via the links between core network device 3B and fabric network devices 1B-6B. In some implementations, the network device may accept the new RSVP path request messages, and may generate acknowledgment messages acknowledging acceptance of the new RSVP path request messages. The network device may provide the acknowledgment messages to the plurality of core network devices.

Figure 1F:
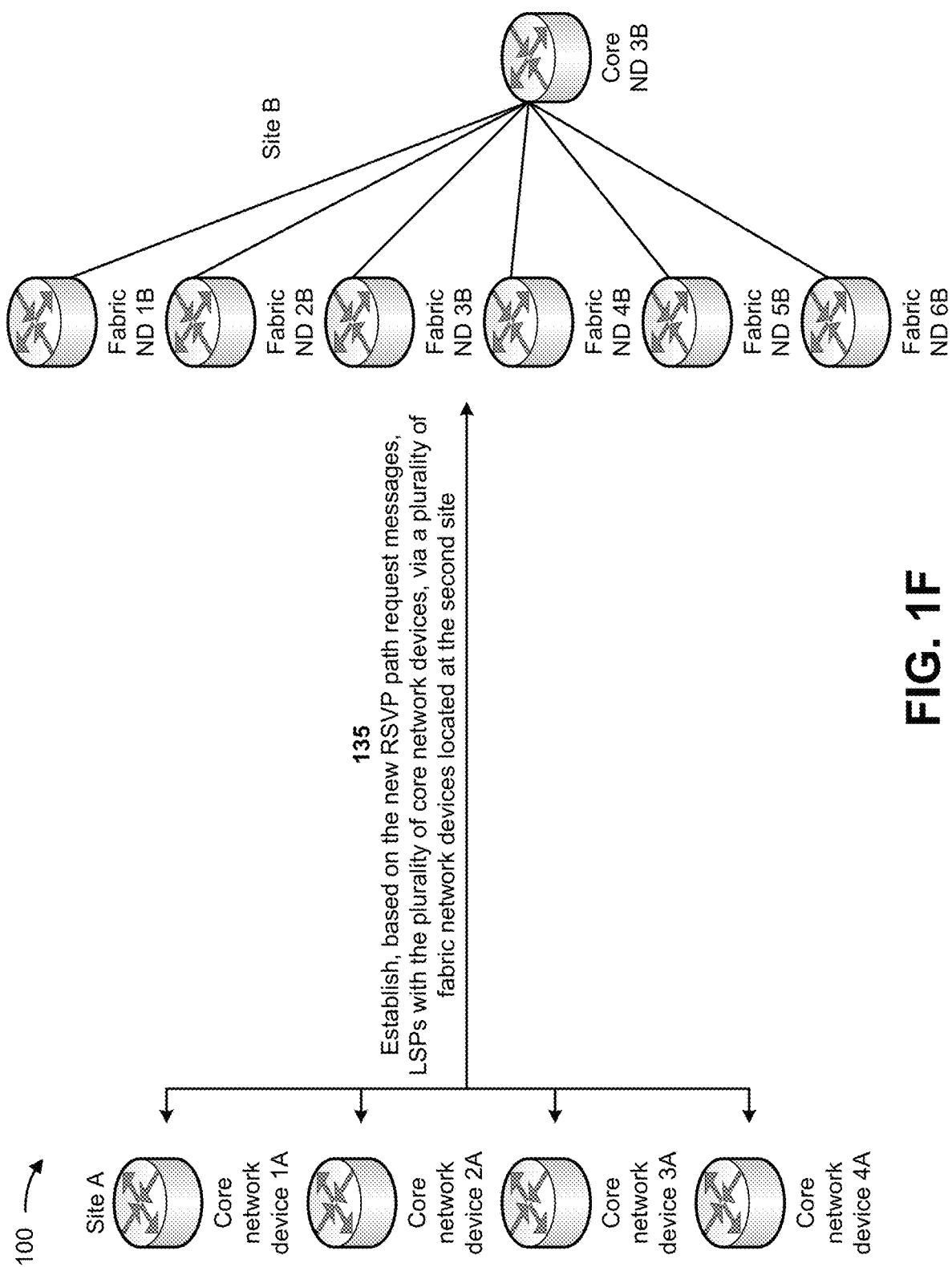

As further shown in FIG. 1F, and by reference number 135, the network device may establish, based on the new RSVP path request messages, LSPs with the plurality of core network devices, via a plurality of fabric network devices located at the second site. For example, the network device may establish, based on the new RSVP path request messages, LSPs with core network devices 1A-4A, via fabric network devices 1B-6B located at site B. When core network device 3B is brought back fully online, the automatic bandwidth LSPs may carry traffic via the links between core network device 3B and fabric network devices 1B-6B, which may prevent traffic congestion and traffic drops.

In some implementations, ingress network devices that do not understand the RSVP path error message may still not be able to setup new LSPs through the restarted network device because of path error until the timeout period expires. If the network device is configured with graceful restart feature, when the restarted network device receives a recovery path request message with a recovery label object from one of the plurality of core network devices, the network device may establish, based on the recovery path request message, an LSP with the one of the plurality of core network devices (e.g., even before the timeout period expires).

In this way, the network device delays RSVP LSP signaling through the network device after restarting the network device. For example, after restarting, the network device may provide an RSVP path error message based on RSVP path requests received from other network devices associated with the network device. The RSVP path error message may indicate that the RSVP path requests cannot be served immediately and that the other network devices need to wait for a configured timeout period (e.g., in seconds, minutes, and/or the like) before re-signaling the RSVP path requests to the restarting network device. Thus, the network device conserves computing resources, networking resources, and/or the like that would otherwise have been consumed by reducing network bandwidth based on utilizing a single link for traffic, causing a traffic outage based on utilizing the single link for traffic, discovering the traffic outage, correcting the traffic outage, handling customer complaints associated with the traffic outage, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
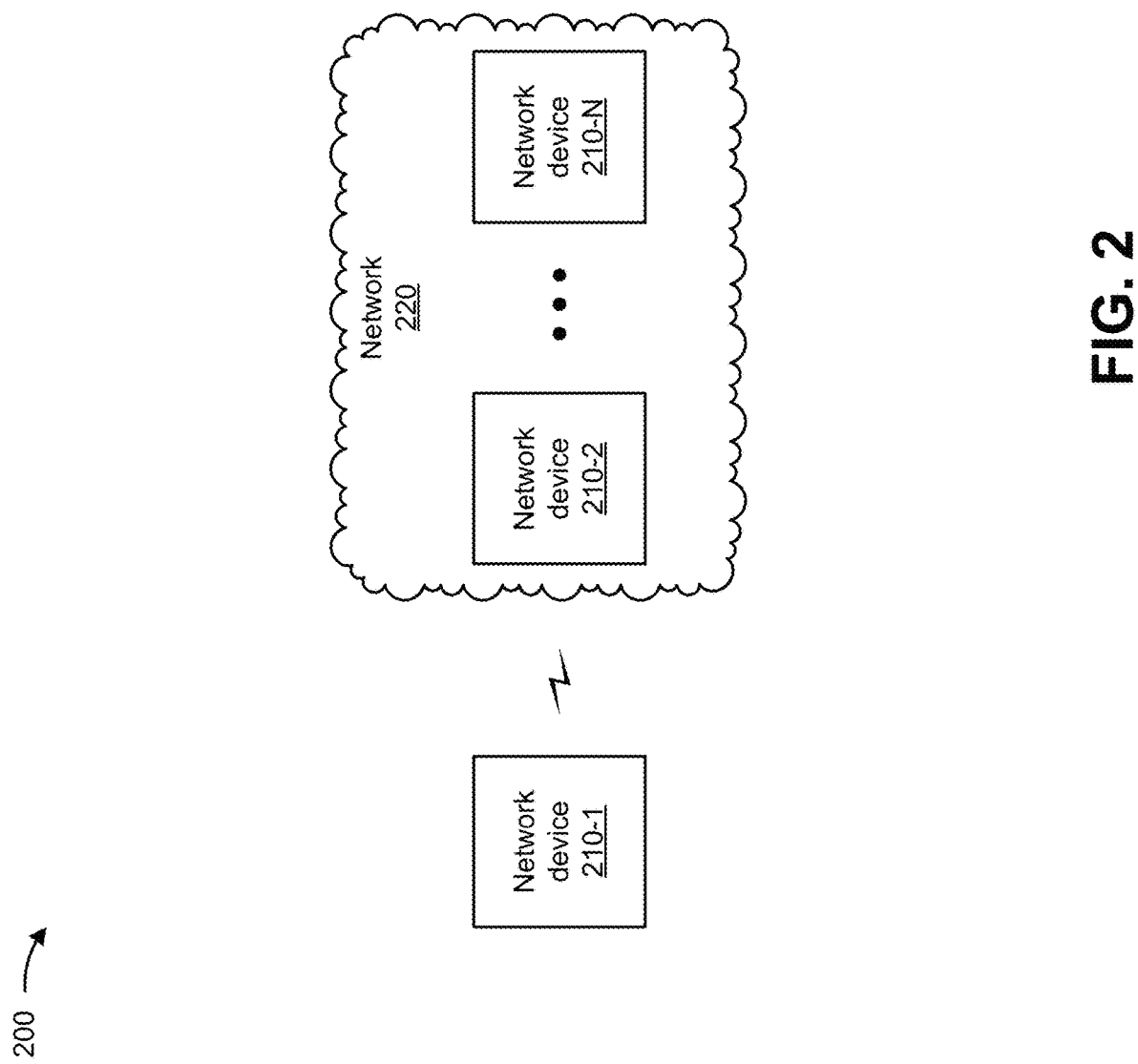
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a group of network devices 210 (shown as network device 210-1 through network device 210-N and a network 220. Each network device 210 may correspond to a core network device, a fabric network device, an edge network device, and/or the like. Devices of the environment 200 may interconnect via wired connections, wireless connections, or a combination of wired and wireless connections.

The network device 210 includes one or more devices capable of receiving, processing, storing, routing, and/or providing traffic (e.g., a packet or other information or metadata) in a manner described herein. For example, the network device 210 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 210 may include a gateway, a switch, a firewall, a hub, a bridge, a reverse proxy, a server (e.g., a proxy server, a cloud server, or a data center server), a load balancer, and/or a similar device. In some implementations, the network device 210 may be a physical device implemented within a housing, such as a chassis. In some implementations, the network device 210 may be a virtual device implemented by one or more computer devices of a cloud computing environment or a data center. In some implementations, a group of network devices 210 may be a group of data center nodes that are used to route traffic flow through the network 220.

The NMS 230 includes one or more devices capable of receiving, generating, storing, processing, providing, and/or routing information, as described elsewhere herein. The NMS 230 may include a communication device and/or a computing device. For example, the NMS 230 may include a server, such as an application server, a client server, a web server, a database server, a host server, a proxy server, a virtual server (e.g., executing on computing hardware), or a server in a cloud computing system. In some implementations, the NMS 230 includes computing hardware used in a cloud computing environment.

The network 220 includes one or more wired and/or wireless networks. For example, the network 220 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network (e.g., an MPLS cloud network), or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
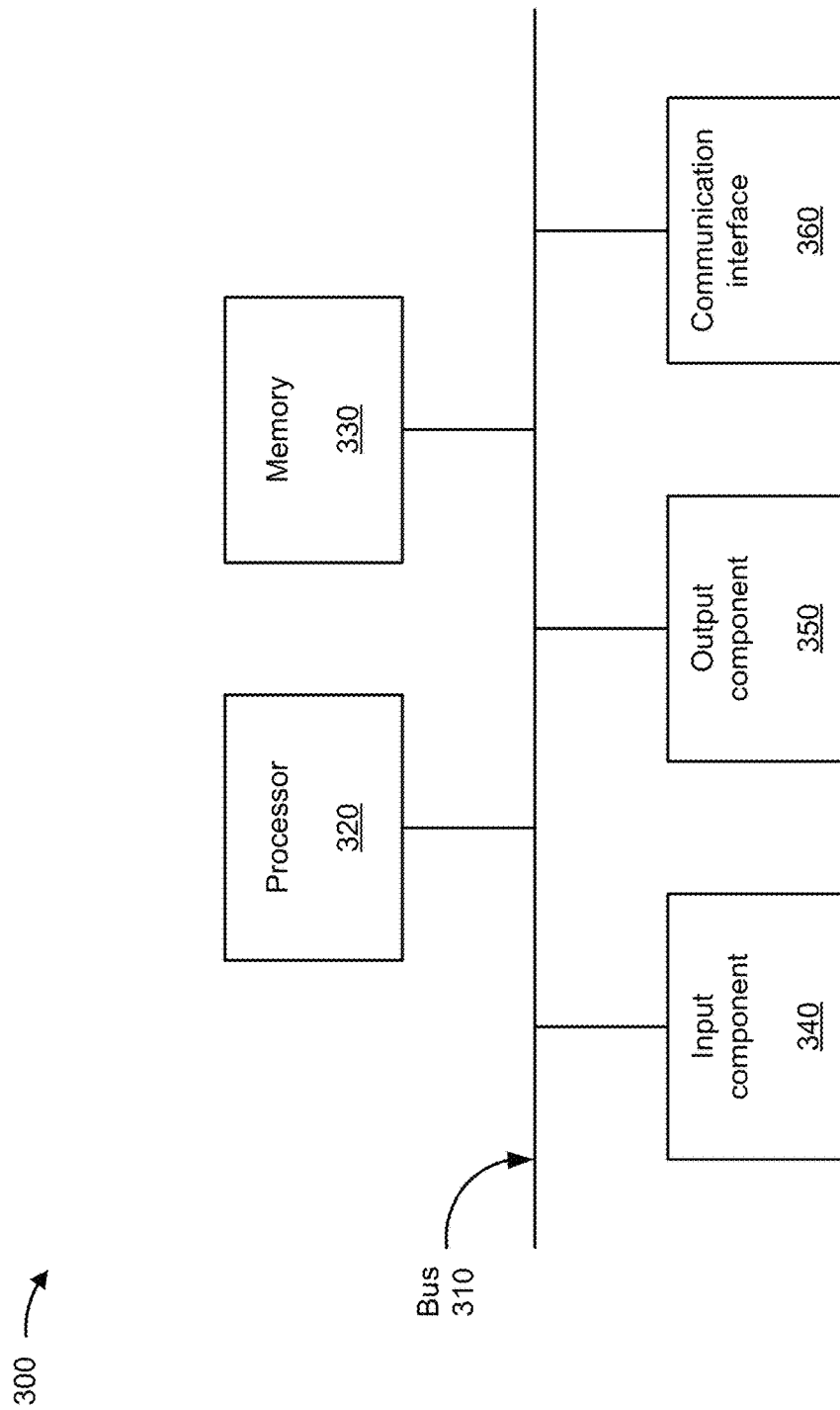
FIGS. 3 and 4 are diagrams of example components of one or more devices of FIG. 2.

FIG. 3 is a diagram of example components of one or more devices of FIG. 2. The example components may be included in a device 300, which may correspond to the network device 210. In some implementations, the network device 210 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
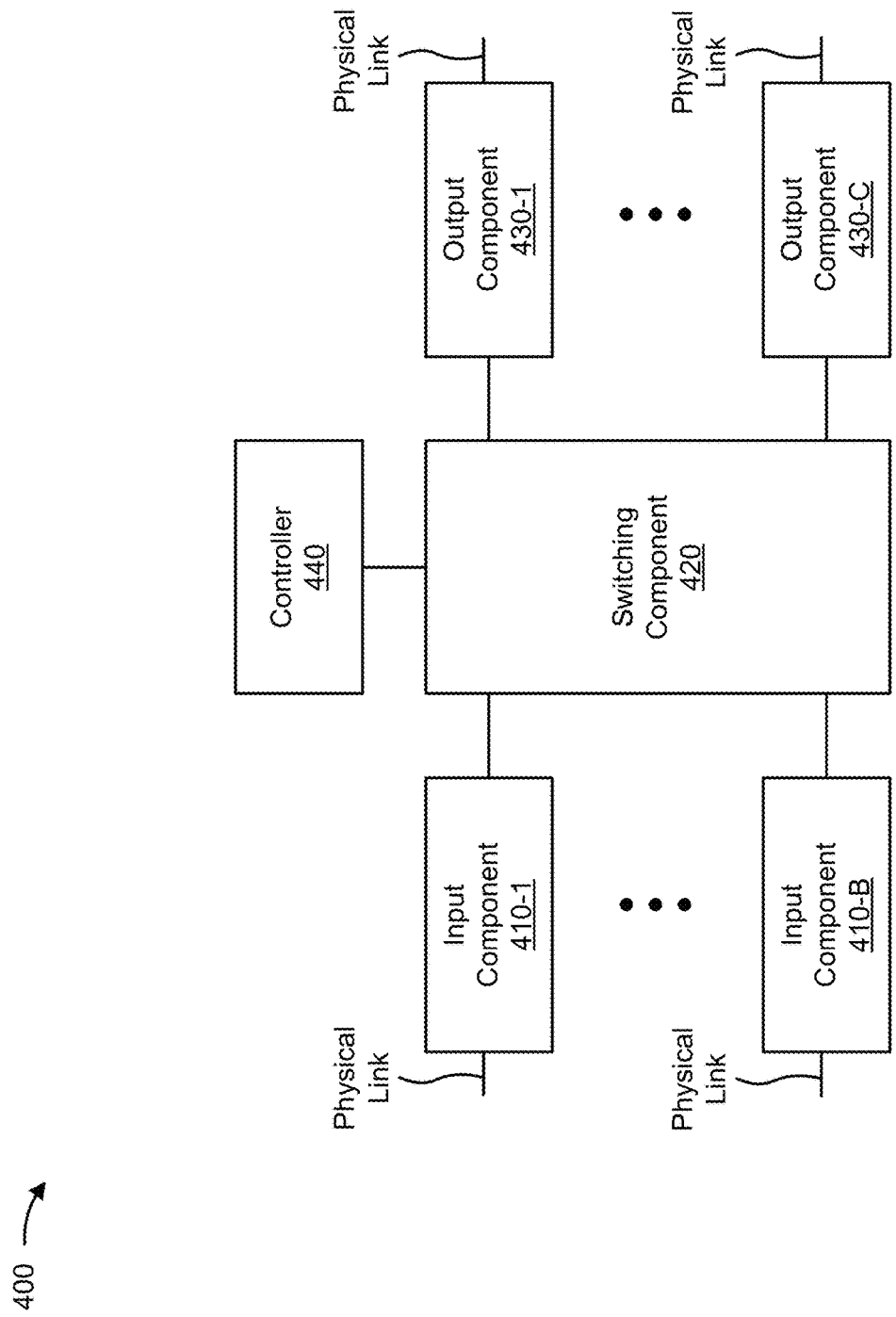

FIG. 4 is a diagram of example components of one or more devices of FIG. 2. The example components may be included in a device 400. The device 400 may correspond to the network device 210. In some implementations, the network device 210 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes based on executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
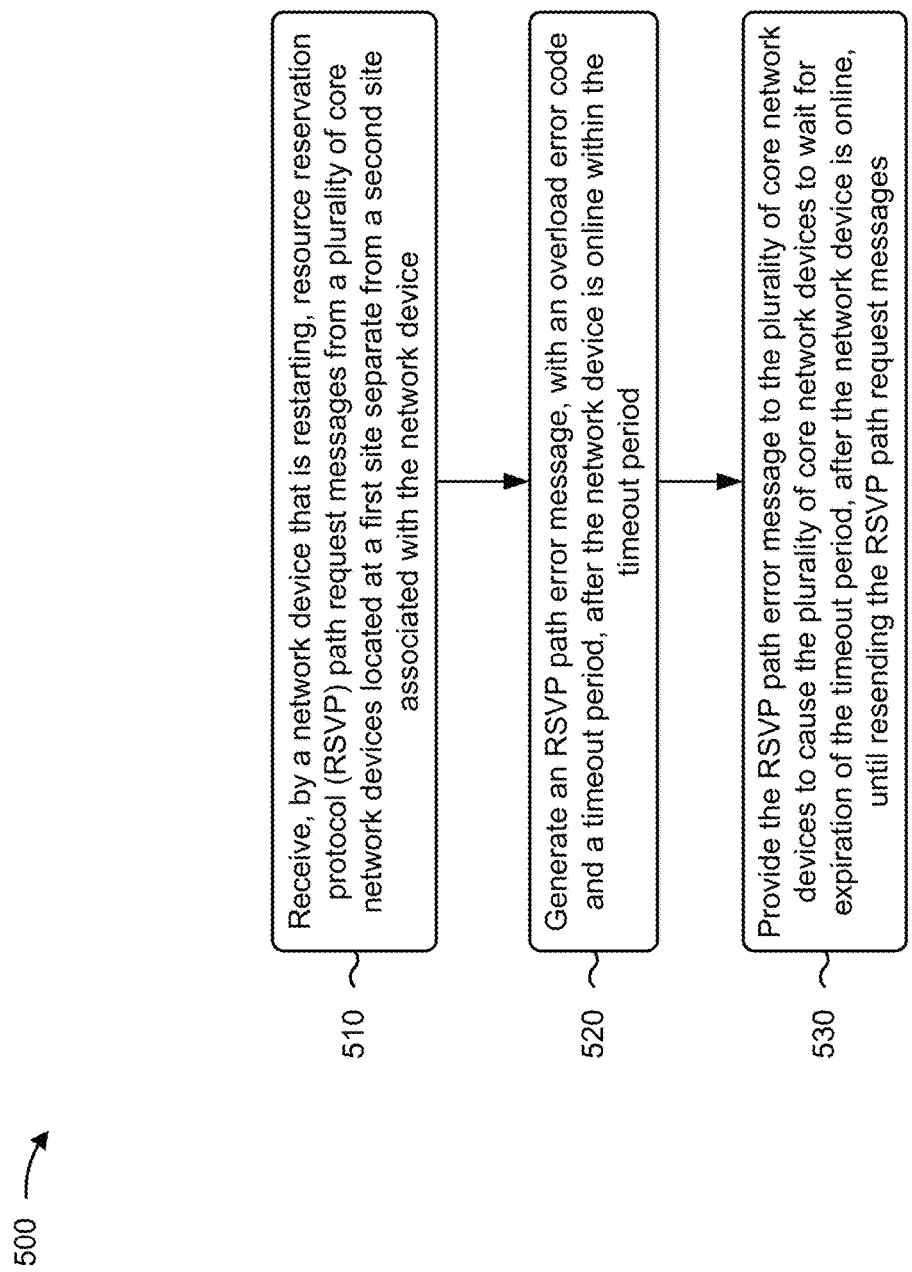
FIG. 5 is a flowchart of an example process for delaying RSVP LSP signaling through a restarting network device.

FIG. 5 is a flowchart of an example process 500 for delaying RSVP LSP signaling through a restarting network device. In some implementations, one or more process blocks of FIG. 5 may be performed by a network device (e.g., the network device 210). In some implementations, one or more process blocks of FIG. 5 may be performed by another device or a group of devices separate from or including the network device. Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include receiving RSVP path request messages from a plurality of core network devices located at a first site separate from a second site associated with the network device that is restarting (block 510). For example, the network device may receive RSVP path request messages from a plurality of core network devices located at a first site separate from a second site associated with the network device that is restarting, as described above. In some implementations, the network device is restarting for maintenance or based on being rebooted. In some implementations, the network device is a core network device located at the second site. In some implementations, the first site communicates with the second site via a MPLS cloud network. In some implementations, the plurality of core network devices are located at a core layer of the first site.

As further shown in FIG. 5, process 500 may include generating an RSVP path error message, with an overload error code and a timeout period, after the network device is online within the timeout period (block 520). For example, the network device may generate an RSVP path error message, with an overload error code and a timeout period, after the network device is online within the timeout period, as described above. In some implementations, the RSVP path error message includes an error code field indicating an RSVP overload error and an error value field indicating the timeout period. In some implementations, the timeout period is provided in seconds or minutes. In some implementations, the RSVP path error message includes one of an IPv4 format or an IPv6 format. In some implementations, the RSVP path error message prevents overloading of the network device by the plurality of core network devices.

As further shown in FIG. 5, process 500 may include providing the RSVP path error message to the plurality of core network devices to cause the plurality of core network devices to wait for expiration of the timeout period, after the network device is fully online, until resending the RSVP path request messages (block 530). For example, the network device may provide the RSVP path error message to the plurality of core network devices to cause the plurality of core network devices to wait for expiration of the timeout period, after the network device is fully online, until resending the RSVP path request messages, as described above.

In some implementations, process 500 includes receiving new RSVP path request messages from the plurality of core network devices after expiration of the timeout period after the network device is fully online, and establishing, based on the new RSVP path request messages, LSPs with the plurality of core network devices, via a plurality of fabric network devices located at the second site. In some implementations, process 500 includes receiving traffic from the plurality of core network devices, via the LSPs and the plurality of fabric network devices located at the second site.

In some implementations, process 500 includes accepting the new RSVP path request messages, generating acknowledgment messages acknowledging acceptance of the new RSVP path request messages, and providing the acknowledgment messages to the plurality of core network devices.

In some implementations, process 500 includes receiving, when the network device is restarted and from one of the plurality of core network devices, a recovery path request message that includes a recovery label object, and establishing, based on the recovery path request message, an LSP with the one of the plurality of core network devices.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code- it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a network device that is restarting, resource reservation protocol (RSVP) path request messages from a plurality of core network devices located at a first site separate from a second site associated with the network device;
    generating, by the network device, an RSVP path error message, with an overload error code and a timeout period, after the network device is online within the timeout period; and
    providing, by the network device, the RSVP path error message to the plurality of core network devices to cause the plurality of core network devices to wait for expiration of the timeout period, after the network device is fully online, until resending the RSVP path request messages.

2. The method of claim 1, further comprising:
    receiving, by the network device, new RSVP path request messages from the plurality of core network devices after expiration of the timeout period after the network device is fully online; and
    establishing, by the network device and based on the new RSVP path request messages, label-switched paths with the plurality of core network devices, via a plurality of fabric network devices located at the second site.

3. The method of claim 2, further comprising:
    receiving, by the network device, traffic from the plurality of core network devices, via the label-switched paths and the plurality of fabric network devices located at the second site.

4. The method of claim 2, further comprising:
    accepting, by the network device, the new RSVP path request messages;
    generating, by the network device, acknowledgment messages acknowledging acceptance of the new RSVP path request messages; and
    providing the acknowledgment messages to the plurality of core network devices.

5. The method of claim 1, wherein the RSVP path error message includes an error code field indicating an RSVP overload error and an error value field indicating the timeout period.

6. The method of claim 1, wherein the timeout period is provided in seconds or minutes.

7. The method of claim 1, wherein the network device is restarting for maintenance or based on being rebooted.

8. A network device, comprising:
    one or more memories; and
    one or more processors to:
        receive resource reservation protocol (RSVP) path request messages from a plurality of core network devices located at a first site separate from a second site associated with the network device;
        generate an RSVP path error message, with an overload error code and a timeout period, after the network device is online within the timeout period;
        provide the RSVP path error message to the plurality of core network devices to cause the plurality of core network devices to wait for expiration of the timeout period, after the network device is fully online, until resending the RSVP path request messages;
        receive new RSVP path request messages from the plurality of core network devices after expiration of the timeout period after the network device is fully online; and
        establish, based on the new RSVP path request messages, label-switched paths with the plurality of core network devices, via a plurality of fabric network devices located at the second site.

9. The network device of claim 8, wherein the network device is a core network device located at the second site.

10. The network device of claim 8, wherein the first site communicates with the second site via a multiprotocol label switching cloud network.

11. The network device of claim 8, wherein the one or more processors are further to:
    receive, when the network device is restarting and from one of the plurality of core network devices, a recovery path request message that includes a recovery label object; and
    establish, based on the recovery path request message, a label-switched path with the one of the plurality of core network devices.

12. The network device of claim 8, wherein the RSVP path error message includes one of an Internet protocol (IP) version 4 format or an IP version 6 format.

13. The network device of claim 8, wherein the RSVP path error message prevents overloading of the network device by the plurality of core network devices.

14. The network device of claim 8, wherein the plurality of core network devices are located at a core layer of the first site.

15. A non-transitory computer-readable medium storing a set of instructions, the set of instructions comprising:
    one or more instructions that, when executed by one or more processors of a network device, cause the network device to:
        receive resource reservation protocol (RSVP) path request messages from a plurality of core network devices located at a first site separate from a second site associated with the network device;
        generate an RSVP path error message, with an overload error code and a timeout period, after the network device is online within the timeout period;
        provide the RSVP path error message to the plurality of core network devices to cause the plurality of core network devices to wait for expiration of the timeout period, after the network device is fully online, until resending the RSVP path request messages;
        receive new RSVP path request messages from the plurality of core network devices after expiration of the timeout period after the network device is fully online;

establish, based on the new RSVP path request messages, label-switched paths with the plurality of core network devices, via a plurality of fabric network devices located at the second site; and receive traffic from the plurality of core network devices, via the label-switched paths and the plurality of fabric network devices located at the second site.

16. The non-transitory computer-readable medium of claim 15, wherein the one or more instructions further cause the network device to:

accept the new RSVP path request messages;

generate acknowledgment messages acknowledging acceptance of the new RSVP path request messages; and provide the acknowledgment messages to the plurality of core network devices.

17. The non-transitory computer-readable medium of claim 15, wherein the RSVP path error message includes an error code field indicating an RSVP overload error and an error value field indicating the timeout period.

18. The non-transitory computer-readable medium of claim 15, wherein the network device is a core network device located at the second site.

19. The non-transitory computer-readable medium of claim 15, wherein the first site communicates with the second site via a multiprotocol label switching cloud network.

20. The non-transitory computer-readable medium of claim 15, wherein the one or more instructions further cause the network device to:

receive, when the network device is restarting and from one of the plurality of core network devices, a recovery path request message that includes a recovery label object; and establish, based on the recovery path request message, a label-switched path with the one of the plurality of core network devices.

\* \* \* \* \*